US008918879B1

(12) United States Patent
Li et al.

(10) Patent No.: US 8,918,879 B1
(45) Date of Patent: Dec. 23, 2014

(54) OPERATING SYSTEM BOOTSTRAP FAILURE DETECTION

(75) Inventors: Yuefeng Li, Nanjiang (CN); Hongbo Gan, Nanjiang (CN); Hua Ye, Nanjiang (CN)

(73) Assignee: Trend Micro Inc., Tokyo (JP)

( * ) Notice: Subject to any disclaimer, the term of this patent is extended or adjusted under 35 U.S.C. 154(b) by 86 days.

(21) Appl. No.: 13/470,551

(22) Filed: May 14, 2012

(51) Int. Cl.
| | |
|---|---|
| G06F 21/00 | (2013.01) |
| G06F 9/00 | (2006.01) |
| G06F 12/14 | (2006.01) |
| G06F 21/57 | (2013.01) |
| G06F 21/56 | (2013.01) |

(52) U.S. Cl.
CPC ............ G06F 21/575 (2013.01); G06F 21/568 (2013.01)
USPC ........... 726/24; 726/22; 726/25; 713/2; 718/1

(58) Field of Classification Search
CPC . G06F 9/4401; G06F 9/445; G06F 2009/445; H04L 9/002; H04L 29/06877; H04L 29/12235; H04L 61/2023; H04L 63/08; H04L 63/14; H04L 63/1441; H04L 63/1408; H04L 63/1416; H04L 63/1425; H04L 63/1433; H04L 63/145
See application file for complete search history.

(56) References Cited

U.S. PATENT DOCUMENTS

| | | | | |
|---|---|---|---|---|
| 5,268,928 A | * | 12/1993 | Herh et al. ..................... 375/222 |
| 5,448,045 A | * | 9/1995 | Clark ............................ 713/176 |
| 5,802,277 A | * | 9/1998 | Cowlard ........................ 726/22 |
| 6,263,431 B1 | * | 7/2001 | Lovelace et al. .................. 713/2 |
| 6,990,579 B1 | * | 1/2006 | Herbert et al. ................ 713/164 |
| 7,134,123 B1 | * | 11/2006 | Berry et al. ........................ 718/1 |
| 7,587,480 B2 | * | 9/2009 | Gebhart et al. ............... 709/223 |
| 7,877,809 B1 | * | 1/2011 | Sutton et al. ..................... 726/24 |
| 7,934,261 B1 | * | 4/2011 | Saguiguit et al. ............... 726/24 |
| 7,971,258 B1 | * | 6/2011 | Liao et al. ........................ 726/24 |
| 8,201,246 B1 | * | 6/2012 | Wu et al. .......................... 726/22 |
| 8,365,297 B1 | * | 1/2013 | Parshin et al. .................. 726/26 |
| 8,392,539 B1 | * | 3/2013 | Chen et al. ..................... 709/220 |
| 2003/0061497 A1 | * | 3/2003 | Zimmer ........................ 713/189 |
| 2003/0126214 A1 | * | 7/2003 | Oliszewski ................... 709/206 |
| 2004/0117610 A1 | * | 6/2004 | Hensley ............................ 713/2 |
| 2004/0236960 A1 | * | 11/2004 | Zimmer et al. ............... 713/200 |
| 2005/0108514 A1 | * | 5/2005 | Rothman et al. .................. 713/2 |
| 2006/0236127 A1 | * | 10/2006 | Kurien et al. ................. 713/193 |
| 2007/0150957 A1 | * | 6/2007 | Hartrell et al. .................. 726/24 |
| 2008/0005551 A1 | * | 1/2008 | Swanson et al. .................. 713/2 |
| 2008/0005797 A1 | * | 1/2008 | Field et al. ....................... 726/24 |
| 2008/0155331 A1 | * | 6/2008 | Rothman et al. ............... 714/36 |
| 2008/0229320 A1 | * | 9/2008 | Ueda ............................. 718/104 |

(Continued)

*Primary Examiner* — Andrew Nalven
*Assistant Examiner* — Walter Malinowski
(74) *Attorney, Agent, or Firm* — Beyer Law Group LLP

(57) ABSTRACT

During a bootstrapping process, path names of necessary bootstrap modules are collected and stored into a file. When an infected bootstrap component is detected, the method initiates emulation of the bootstrapping process within a virtual machine rather than directly cleaning malware from the infected bootstrap component. A settings file is copied into the virtual machine indicating the necessary bootstrap components in the host computer (including the infected component). Alternatively, the actual components are copied into the virtual machine. A clean version of the infected bootstrap component is made available to the virtual machine. The virtual machine is launched using the bootstrap components (including the clean version of the infected bootstrap component) and it emulates the bootstrapping process of the operating system. A successful bootstrap indicates the infected bootstrap component may be cleaned on the host computer. An unsuccessful bootstrap indicates the infected bootstrap component should not be cleaned of malware.

14 Claims, 6 Drawing Sheets

(56) References Cited

U.S. PATENT DOCUMENTS

| | | | |
|---|---|---|---|
| 2009/0038011 A1* | 2/2009 | Nadathur | 726/24 |
| 2009/0158419 A1* | 6/2009 | Boyce | 726/13 |
| 2009/0187992 A1* | 7/2009 | Poston | 726/24 |
| 2009/0249053 A1* | 10/2009 | Zimmer et al. | 713/2 |
| 2010/0030878 A1* | 2/2010 | Grabowski et al. | 709/222 |
| 2010/0070800 A1* | 3/2010 | Hanna | 713/2 |
| 2011/0023120 A1* | 1/2011 | Dai et al. | 726/23 |
| 2011/0119358 A1* | 5/2011 | Woodward | 709/220 |
| 2011/0307711 A1* | 12/2011 | Novak et al. | 713/188 |
| 2013/0054948 A1* | 2/2013 | Raj et al. | 713/2 |
| 2013/0117006 A1* | 5/2013 | Varghese et al. | 703/22 |
| 2013/0152201 A1* | 6/2013 | Gullotto et al. | 726/24 |
| 2013/0339957 A1* | 12/2013 | Azam et al. | 718/1 |

* cited by examiner

OPERATING SYSTEM BOOTSTRAP FAILURE DETECTION

FIELD OF THE INVENTION

The present invention relates generally to detection and prevention of malware. More specifically, the present invention relates to detecting and removing malware present in an operating system of a computer without damaging the operating system.

BACKGROUND OF THE INVENTION

Malicious software such as computer viruses, worms, etc., more generally known as malware, continues to increase in sophistication despite constant efforts to prevent it. In particular, certain advanced malware is able to infect the bootstrap components of a computer operating system such as the master boot record (MBR), operating system driver files, service items in the registry and other components such as native applications. Such an infection is especially problematic in the case of malware such as a root kit or a boot kit.

As known in the art, a root kit is software inserted onto a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect. A backdoor is a piece of software that allows access to the computer system by bypassing the normal authentication procedures. There are two groups of backdoors depending upon how they work and spread. The first group works much like a Trojan horse, i.e., they are manually inserted into another piece of software, executed via their host software and spread by the host software being installed. The second group works more like a worm in that they get executed as part of the boot process and are usually spread by worms carrying them as their payload. A boot kit is much like Root kit, but it usually inserts malicious code into system components which are indispensable for operating system bootstrapping and keeps alive and invisible even after operating system rebooting.

Because this type of malware may have infected the bootstrap components of the operating system it can be problematic to clean this malware or to remove it. Historically, it has been hard to determine whether cleaning or removing this type of malware might lead to an operating system bootstrap failure, thus causing a very bad user experience, let alone a public-relations disaster for the antivirus vendor of the cleanup software.

Accordingly, an improved technique is desired for detecting, cleaning and/or removing malware that may have infected the bootstrap components of a computer operating system.

SUMMARY OF THE INVENTION

To achieve the foregoing, and in accordance with the purpose of the present invention, a technique is disclosed that emulates the bootstrapping an operating system of the host computer using a virtual machine.

One advantage is that if the virtual machine detects a bootstrap failure using a clean version of a bootstrap file that had been infected by malware, then it can alert a damage cleanup engine not to clean the malware from the infected bootstrap file. Thus, a bootstrap failure of the actual host computer can be avoided. False alarms can also be avoided because if the virtual machine successfully performs the bootstrap process then it can alert the damage cleanup engine that it is safe to clean malware from an infected bootstrap file.

In a first embodiment a method detects a potential bootstrap failure on a host computer by first detecting an infected bootstrap component (such as a computer file, system driver, disk sector, etc.). This bootstrap component is necessary in a bootstrapping process of the operating system of the host computer and would normally need to be cleaned by antivirus software before the computer can be bootstrapped again. Next, the method copies a file into the virtual machine that indicates the necessary bootstrap components in the host computer, these bootstrap components being necessary for bootstrapping the computer. These bootstrap components include the infected bootstrap component which has not yet been cleaned on the host computer. Additionally, the antivirus software (or a damage cleanup module or engine, or other software) does create (or locate) a clean version of the infected bootstrap component to be used by the virtual machine. A link to this clean version is passed to the virtual machine from a cleanup module of the host computer. Finally, the virtual machine is launched using the bootstrap components and it emulates the bootstrapping process of the operating system of the host computer, using the clean version of the infected bootstrap component (not the infected bootstrap component). A successful bootstrap indicates to the host computer that the infected bootstrap component may now be cleaned on the host computer (by replacing or modifying the actual bootstrap component). An unsuccessful bootstrap indicates that the actual infected bootstrap component should not be cleaned of malware because its use would not permit the computer to bootstrap correctly.

In a second embodiment a method detects a potential bootstrap failure on a host computer by first detecting an infected bootstrap component (such as a computer file, system driver, disk sector, etc.). This bootstrap component is necessary in a bootstrapping process of the operating system of the host computer and would normally need to be cleaned by antivirus software before the computer can be bootstrapped again. Next, the method copies the necessary bootstrap components from the host computer into a virtual machine of the host computer, these bootstrap components being necessary for bootstrapping the computer. These bootstrap components include the infected bootstrap component which has not yet been cleaned on the host computer. Additionally, the antivirus software (or a damage cleanup module or engine, or other software) does create (or locate) a clean version of the infected bootstrap component to be used by the virtual machine. This clean version is passed to the virtual machine from a cleanup module of the host computer. Finally, the virtual machine is launched using the copied bootstrap components and it emulates the bootstrapping process of the operating system of the host computer, using the clean version of the infected bootstrap component (not the infected bootstrap component).

In a third embodiment a method collects bootstrap components on a host computer for later use in emulating bootstrapping within a virtual machine. First, the method registers a callback function in an operating system of the host computer as well as a first boot driver that will be loaded first during the bootstrapping process. Next, an actual bootstrap of the operating system is initiated. When each module is loaded into memory during bootstrapping, the callback function is triggered and it records the pathname of each module as well as optionally other information. All of this recorded information is saved into a settings file on the host computer. Once the bootstrapping process ends, the settings file is parsed to retain only those path names of modules that are relevant and needed in the bootstrapping process.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, cleaning malware from bootstrap components of an operating system can be problematic because it can be difficult to remove the malware successfully while ensuring a successful bootstrap of the operating system. The present invention provides a technique for detecting a potential bootstrapping failure after proposed malware cleanup. Advantageously, this detection technique can discover a potential bootstrapping failure before the actual bootstrapping of the operating system using a bootstrap component that has been cleaned of malware. An embodiment of the present invention uses a virtual machine to test the bootstrapping process using the component that has been cleaned of malware. If successful, then the actual bootstrapping process is allowed to boot the operating system using a bootstrap component that has been cleaned of malware (or that has been replaced with a clean version).

Invention Overview

Figure 1:
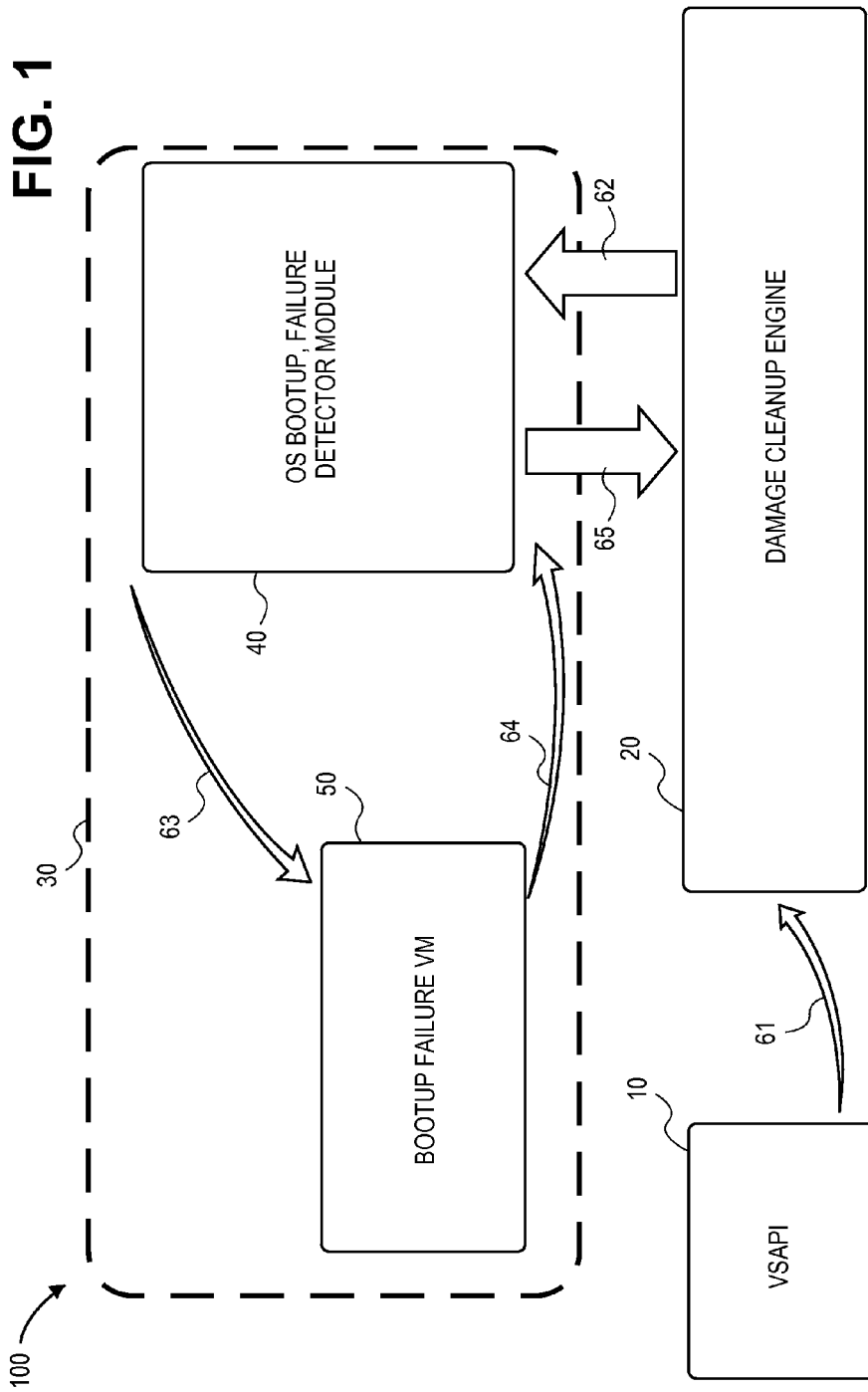
FIG. 1 is a block diagram of a bootstrap failure detection system.

FIG. 1 is a block diagram of a bootstrap failure detection system 100. This system may be implemented upon any suitable computer such as a computer running a Microsoft operating system, an Apple operating system, a Linux operating system, etc. In one specific embodiment of the invention, the system is implemented on a Microsoft operating system such as Windows XP SP3, Windows 2003 or Windows 7. Of course, with minor variations the invention may be implemented upon any other Microsoft operating system. One of skill in the art will be able to adapt the below-described invention for implementation on other operating systems and computers.

As shown in FIG. 1, system 100 includes a typical virus scanning software module 10, such as Virus Scan API (VSAPI) available from Trend Micro Inc. The virus scanning module is any suitable antivirus module that detects malware and may attempt to remove it. The damage cleanup engine 20 is any suitable software module such as the DCE (also available from Trend Micro) arranged to remove malware from infected operating systems and files. Included within a module of the invention 30 are an operating system bootup failure detector module 40 and a bootup failure virtual machine 50; these modules operate together in order to emulate the bootstrapping of the operating system in order to detect if removal of any malware has affected the bootstrapping procedure. Module 30 may be implemented separately from damage cleanup engine 20. The detector module 40 is implemented as a proxy of the virtual machine. In other words, if the damage cleanup engine has requests or data for the virtual machine it communicates this information via the detector module. Likewise, if the virtual machine has results or data for the damage cleanup engine it will use the detector module to relay this information. As shown, the detector module is outside of the operating system of the virtual machine. In the embodiment shown in this figure the bootstrap failure detection system is integrated with the antivirus module, although the present invention may be used standalone or integrated with other software modules.

If the antivirus module 10 detects malware on the computer, and in this case, detects malware within any of the bootstrap components, the antivirus module will instruct 61 the damage cleanup engine 20 to invoke the present invention. In this example, before an actual clean of the malware begins, engine 20 begins the process by first preparing file settings for use by the detector module and virtual machine. Next, the cleanup engine directs 62 the detector module to begin emulation using a clean version of a bootstrap component that had been infected. The detector module deploys 63 the file settings into the virtual machine and starts up the virtual machine in order to emulate the operating system bootstrapping process. In one embodiment, the file settings are a file list of the host operating system which means that the detector module may simply copy the files into the virtual machine according to the file settings. Or, the virtual machine may be provided with the file list so that it may simply access the files itself.

Next, the virtual machine emulates the bootstrapping process of the operating system and determines whether the bootstrap is successful. After emulation is complete, the virtual machine notifies 64 the detector module whether or not the bootstrap using these files and file settings has been successful or not. Finally, based upon these results, the detector module alerts 65 the damage cleanup engine as to whether or not to perform the actual cleanup of the malware from the bootstrap components. These results and the decision of the damage cleanup engine may also be output to the antivirus module, any other software module, the computer display screen, or to user via any suitable computer output.

Interaction Between Detector Module and Virtual Machine

As mentioned above, the present invention includes two major software modules, the operating system bootup failure detector module 40 and the bootup failure virtual machine 50. These modules operate under direction of any suitable software module in a computer such as an antivirus module, a cleanup engine, etc.

Figure 2:
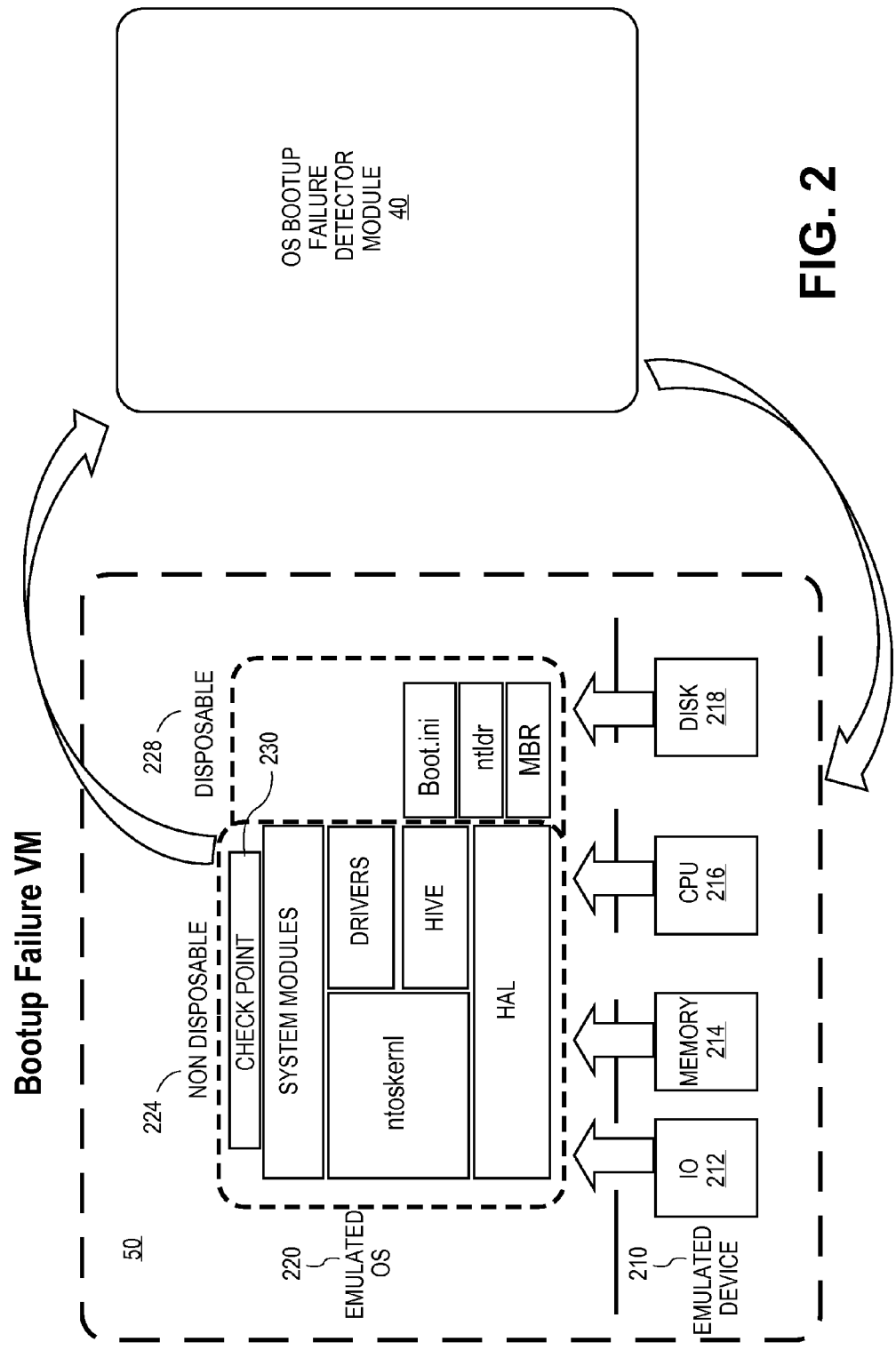
FIG. 2 illustrates in greater detail the interaction of the detector module and the virtual machine of FIG. 1.

FIG. 2 illustrates in greater detail the interaction of the detector module 40 and the virtual machine 50 of FIG. 1. The detector module 40 may be a standalone software module or may be integrated with the damage cleanup engine or even into an antivirus module. The detector module is responsible for interacting with the damage cleanup engine, starting up the bootstrap emulation, and returning the emulation result to the damage cleanup engine or the antivirus module.

The bootup failure virtual machine 50 is responsible for emulating bootstrapping of the actual host operating system as closely as possible. The virtual machine may be implemented in different manners including using virtual machine environments such as Qemu, Xen Hypervisor, Bochs, Virtual Box and so forth. In one specific embodiment, the virtual machine is implemented using open source software such as Virtual Box which provides for more flexibility. The virtual machine includes three main parts: the emulated devices 210, the emulated operating system 220, and the checkpoint module 230.

In order to best mimic the environment of the host computer, the virtual machine emulates commonly used devices in software. The emulated devices may include typical I/O devices 212 (such as a keyboard, mouse, speaker, microphone, display, etc.), memory 214, a CPU 216, a disk 218, and other devices such as a VGA, a USB port, a COM port, a Network Interface Controller, and so forth.

Preferably, the devices that are emulated are those devices present on the computer which are necessary for bootstrapping the operating system, i.e., the basic devices such as disk, CPU, memory, I/O and the PCI and SCSI buses. There is no need to emulate other special or third-party devices that are not related to bootstrapping the operating system. For example, emulation of special devices such as a USB device (a joystick for a video game, for example) is not strictly necessary. If a special device needs to be emulated, the virtual machine can act as a proxy and use the actual operating system.

In general, the virtual machine need only emulate the same type of these basic devices. For example, if the host computer uses a disk with a particular bus (such as SCSI), then the virtual machine should emulate a disk with that same bus. Concerning the CPU, the virtual machine should emulate a CPU using the same instruction set as the CPU on the host computer. Further, the exact size of the computer's memory need not be emulated, only the same type of memory using the same bus.

Emulation of this layer of devices within the virtual machine provides the basic computer environment in software form which is necessary for emulation of the operating system bootstrapping process. Because this emulation is separate from the actual host computer, it may execute as a normal program in user mode on the host computer. Alternatively, it may execute in kernel mode.

The emulation of the operating system 220 includes bootstrap components including system files or disk sectors in emulated disk storage. These components include non-disposable components 224 and disposable components 228. Disposable components mean that they are typically loaded before or during startup of the operating system kernel and they typically will not exist in memory after the operating system bootstraps successfully. The nondisposable components are loaded during or after startup of the operating system kernel and will exist in memory after the operating system bootstraps successfully. As shown, the disposable components include bootstrap related modules such as MBR, "ntldr," "Boot.ini" etc. The Hive file is non-disposable because it will be loaded into memory and kept there during booting of the operating system.

The nondisposable components include kernel bootstrap related modules such as HAL, the operating system kernel, bootstrap drivers, system drivers, system process related modules (such as SMSS.exe, CSRSS.exe, etc.) and the checkpoint module. A detailed description on how to collect such bootstrap components is explained below. These bootstrap components will be copied into the virtual machine and started as if they were part of the normal operating system when emulation of the operating system is launched by the detector module 40.

The checkpoint module 230 is registered as one of the bootstrap components of the emulated operating system by the detector module 40. It is responsible for checking the current status of the bootstrap procedure and reporting that status to the detector module 40. If the virtual machine 50 fails to boot, the checkpoint module 230 will not be launched, and the detector module 40 will detect the status of virtual machine 50 as failing to boot. For instance, the checkpoint module may be registered as an auto-startup program launched by the program "explorer.exe". Thus, whenever the checkpoint module is launched, this means that emulation of the bootstrap procedure was successful.

Collection of Bootstrap Components

As mentioned in FIG. 2, the necessary bootstrap components are collected in order to emulate the bootstrapping procedure of the host computer. These bootstrap components may be collected at any time before the damage cleanup engine launches emulation of the bootstrapping procedure of the operating system.

Figure 3:
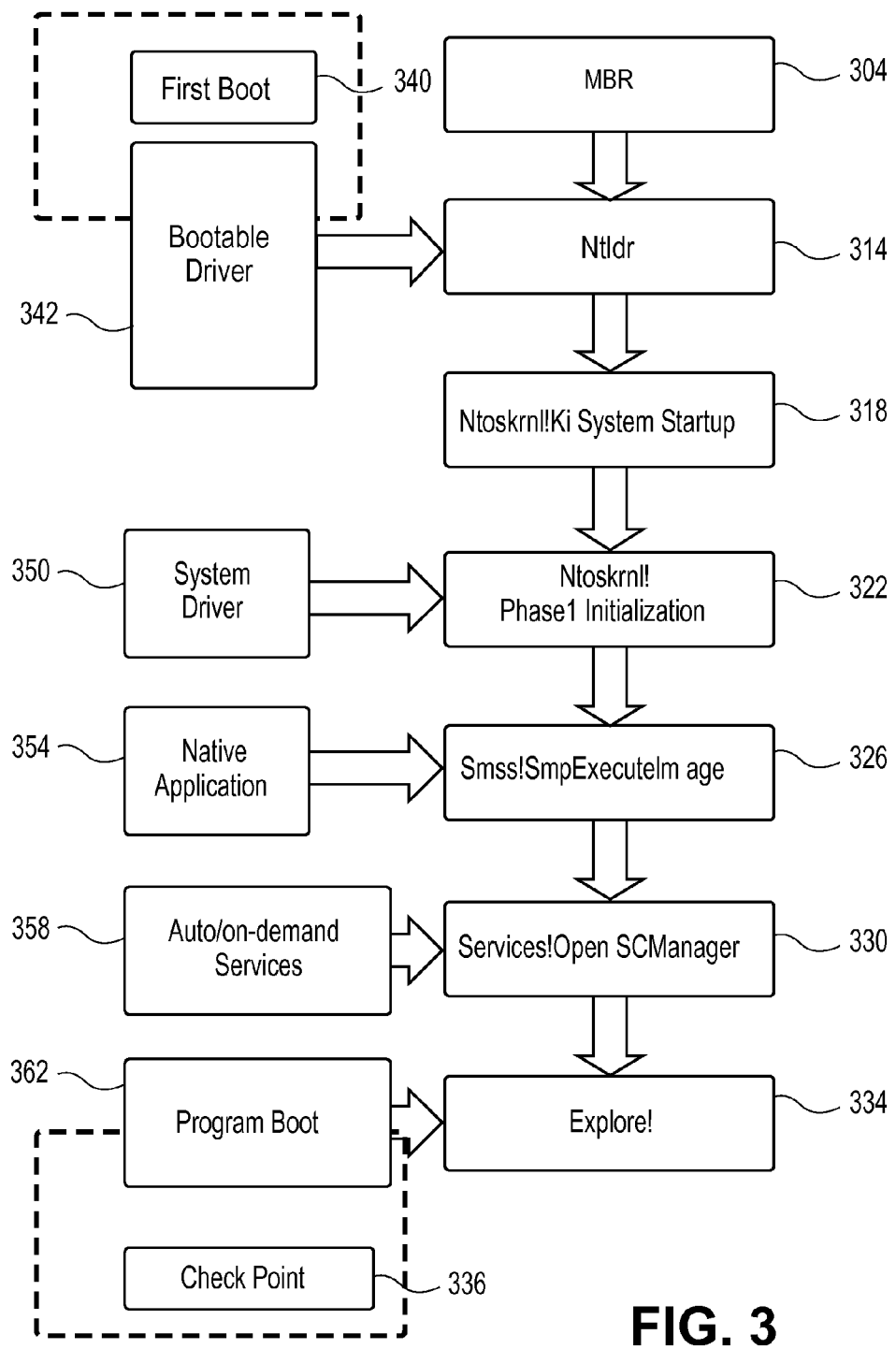
FIG. 3 illustrates one embodiment of a process for collecting these bootstrap components during the bootstrapping process.

FIG. 3 illustrates one embodiment of a process for collecting these bootstrap components during the bootstrapping process. This bootstrapping process is particular to an operating system; other operating systems may bootstrap differently. The right-hand side of the figure shows bootstrap elements 304-334 that are used to load the bootstrap components 342-362. For example, element 304 is used to load element 314 which in turn is used to load element 318. In a similar fashion, element 314 loads driver 342, element 322 loads driver 350, and so forth. Programs First Boot 340 and Checkpoint 336 are programs that will be executed during the bootstrapping process.

In one embodiment, First Boot 340 is registered as the first driver among bootable drivers 342 to boot up. In other words, First Boot will be the first driver among all bootable drivers to start upon initiation of the bootstrapping process. When this First Boot 340 gains control of the operating system it will register a callback function with the operating system kernel, for example, a "Load Image Notification" callback function. The reason why the First Boot 340 is designed to be registered to start first is that the collection process should be launched and executed as early as possible in the bootstrap process so as to collect the most bootstrap information.

Next, when any subsequent bootstrap component is loaded into memory (such as components 342-362 and components 304-334) the callback function will be triggered and it will record the image path, image name and any other necessary information (such as its MD5, file size, date and time of last time modification, and so forth) of these loaded bootstrap components. The callback function may record all of this information in the form of a list of file settings (including file path names) in the host operating system.

Once the checkpoint module 336 launches, that launching indicates the end of the operating system bootstrapping process. All of the saved information regarding the components loaded during an actual bootstrapping process is now recorded in the file settings list.

There are other ways of recording bootstrap components information that may also be utilized. For example, after setting the "/bootlog" flag in the "Boot.ini" configuration file of the current Microsoft operating system and rebooting, the "bootlog.txt" file in the system folder will be generated by the operating system which will record all the system images during bootstrapping including file path. The information in this file may then be used as the file settings list is used.

Figure 4:
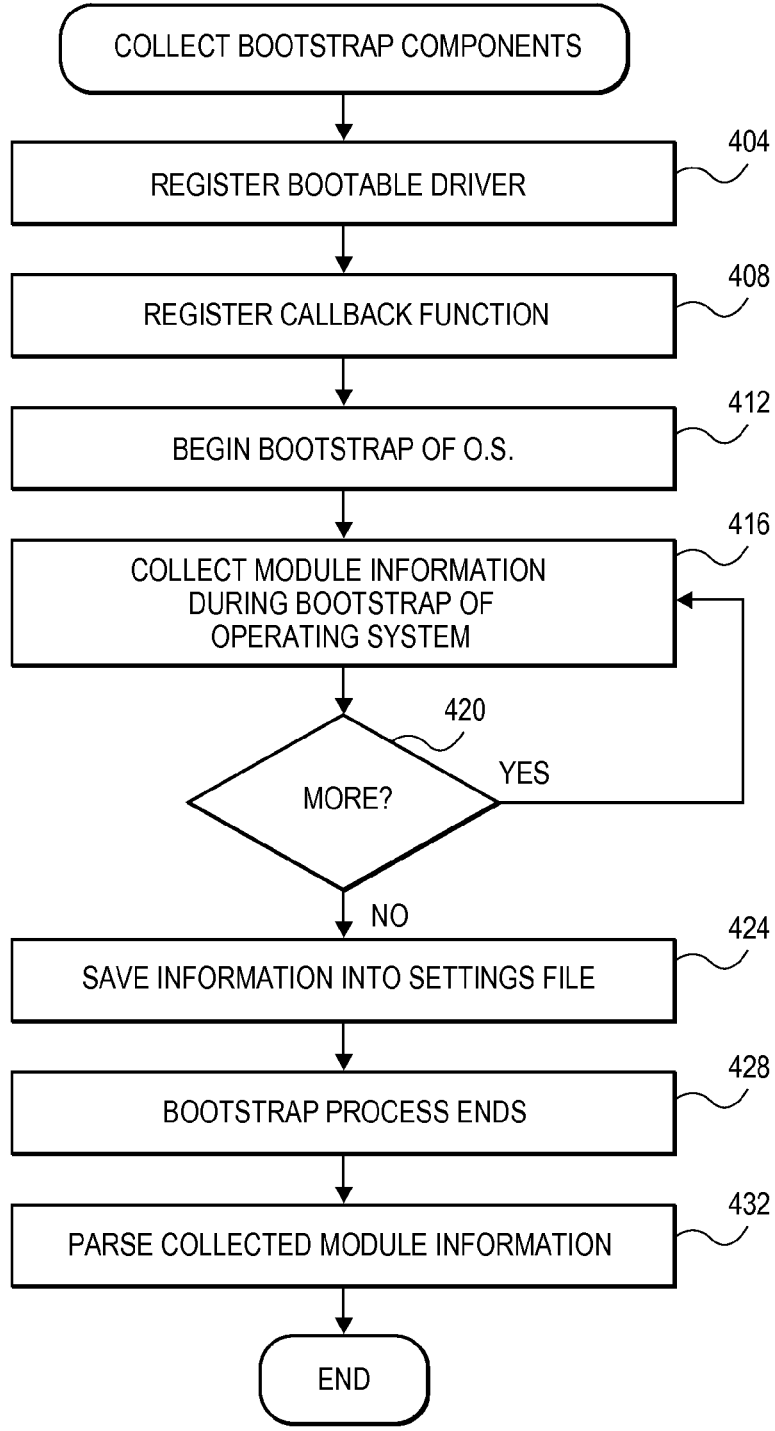
FIG. 4 is a flow diagram describing one embodiment of the present invention for collecting bootstrapping information.

Finally, all of the loaded modules are parsed. According to the file path information saved in the settings file (or the "bootlog.txt" file), the detector module 40 will separate the files indispensable for bootstrapping from the files which are irrelevant with bootstrapping from among all system files saved. The separation of bootstrap components may be performed as follows. We would like to deploy as few files as possible in order to promote the performance and efficiency of the bootstrap emulation process in the virtual machine 50; also, we keep the files which are not relevant to bootstrapping away from the emulation process in order to reduce unnecessary false alarms during bootstrap failure detection Flow Diagram—Collect Information FIG. 4 is a flow diagram describing one embodiment of the present invention for collecting bootstrapping information. In one embodiment, the damage cleanup engine 20 is responsible for performing the following steps except where noted. In a first step 404 the cleanup engine registers the First Boot driver 340 as a first driver to be bootstrapped on the host machine. The damage cleanup engine 20 deploys the First Boot driver 340 on the host in order to collect as much bootstrap information as possible during bootstrapping.

Next, in step 408 the regular bootstrapping process of the operating system on the host machine begins. This process may begin in response to a user turning on the computer, selecting the "restart" option, selecting a "reboot" option, or typing a "shutdown-r" command into the "cmd" shell.

When the First Boot driver 340 is launched and executed and gains control of the system during bootstrapping, it will register the callback function with the operating system kernel in step 412. In one embodiment, this callback function is the Load Image Notification callback function. During this bootstrap process, in step 416 the callback function of the First Boot driver 340 is triggered to collect information on each bootstrap component as each component is loaded. Under the design of the Microsoft operation system, the callback function is called by the kernel whenever it finishes loading each system image during bootstrapping. For example, information on each of components 342 through 362 will be collected in turn. Once no more components are available to be loaded, then control moves to step 424.

Once collected, in step 424 all this information is saved into a suitable location, such as a settings file, available to the damage cleanup engine for later use. Next, in step 428 the bootstrap process ends and the operating system of the computer is running successfully. At this point, all of the module information for all of the bootstrap components has been collected during a normal bootstrap process. In step 432 the damage cleanup engine parses all of the collected module information from the loaded bootstrap components. Because many files will have been collected during the bootstrap process, the engine breaks the files into two groups: those that are relevant and necessary during the bootstrap process and those that are not. Files related to the bootstrap process are kept while files that are not are ignored or deleted. The settings file is modified to only retain the relevant files or the relevant files are stored into a new location.

One way to judge which files are related to the bootstrap process depends on the extent to which we want to emulate the bootstrap process. Typically, we only care about Bootable Driver 342, System Drivers 350, Native Application 354, Auto/On-demand Service 358, and basic Microsoft operating system modules, with the exception of Program Boot 362. Of course, information from other files may be retained. The collected information does include modules 304-334, although this information may be parsed and not kept.

Flow Diagram—Detect Potential Bootstrap Failure

Figure 5:
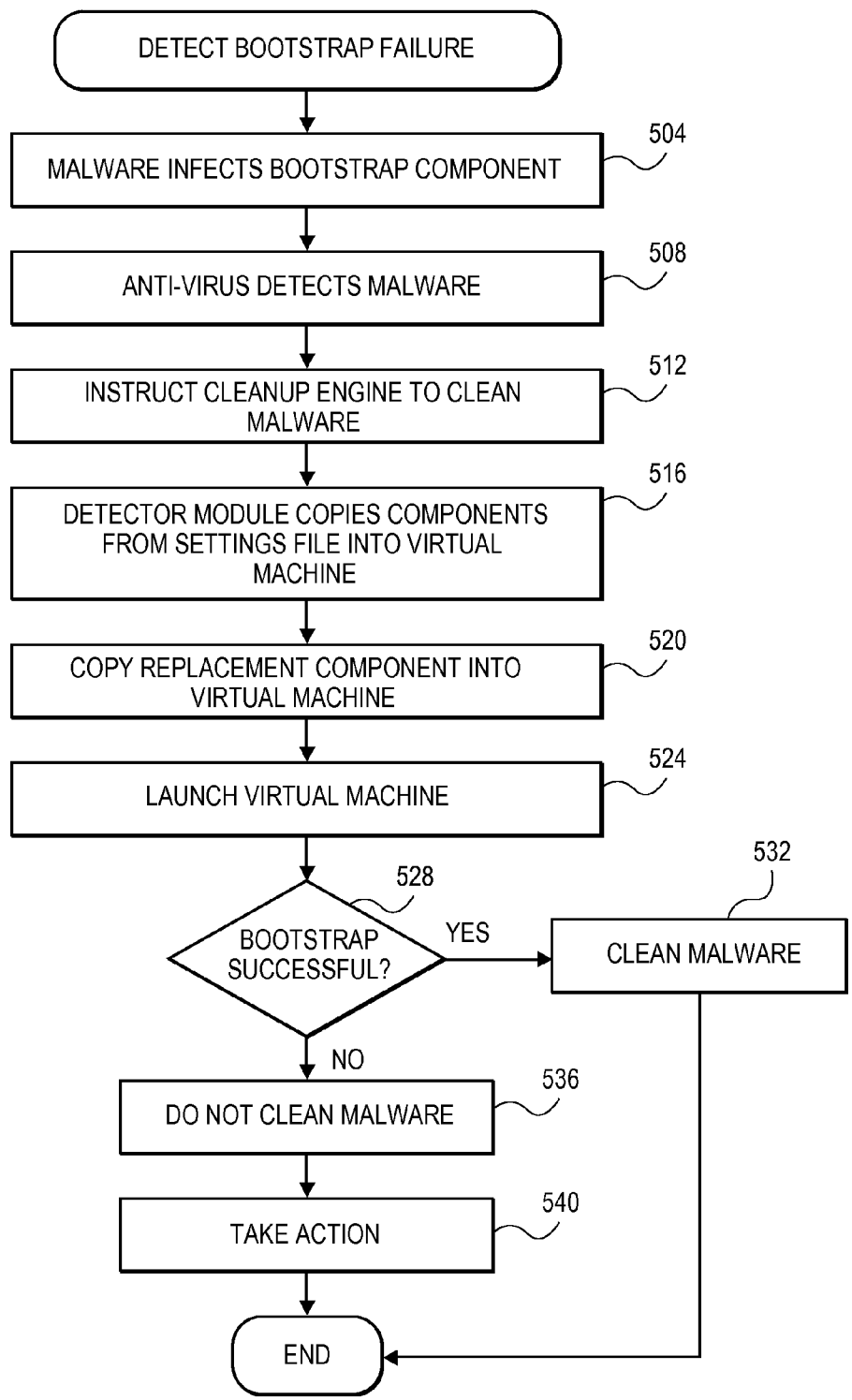
FIG. 5 is a flow diagram describing how a potential bootstrap failure may be detected.

FIG. 5 is a flow diagram describing how a potential bootstrap failure may be detected. Once the bootstrap information has been collected above, the present invention is able to begin operation upon a host computer in order to detect a potential bootstrap failure in view of a possible malware infection.

In step 504 it is assumed that at some point malware may infect one of the bootstrap components such as a system driver, one of the services, etc. This can be caused by a root kit, boot kit, etc. In step 508 a suitable antivirus software module detects the malware that has infected one of the bootstrap components. For example, antivirus module 10 may detect the malware and then communicate with damage cleanup engine 20. In step 512 the antivirus module instructs the cleanup engine 20 to clean the malware from infected bootstrap components. In this situation, however, instead of immediately cleaning malware from an infected bootstrap file in the host computer (perhaps by replacing the infected file with a known, good file) the damage cleanup engine makes use of the present invention by instructing the detector module to deploy the virtual machine.

In step 516 the cleanup engine provides the detector module with instructions to proceed, the name of the infected file, and a clean version of the infected file. The detector module will then provide the virtual machine with the file settings (collected in FIG. 4), the pathname of the infected file and a pathname of a clean version of the infected file (step 520). Alternatively, the detector module may simply provide the actual files to the virtual machine. Because malware has infected one of the bootstrap components, the settings file will necessarily include a path to the infected file. Because it will be useful to check whether the virtual machine can perform the bootstrapping process successfully as if the infected file has been replaced with the clean version, it is necessary to provide the virtual machine either with a copy of a clean version of the infected file or its pathname. In this manner, the virtual machine can attempt the bootstrap process and emulate the result that would be achieved if the damage cleanup engine had cleaned the malware from infected bootstrap component on the host computer. It preferable that the detector module copies the bootstrap components from the host computer into the virtual machine because the virtual machine should focus on the machine starting up, and not care about what it is emulating.

The following is an example of how the above may be performed in one embodiment. Assume that a Root kit has infected the "SomeSys.sy" driver in the C:\windows\System\Drivers\ folder and the related service is \HKEY_LOCAL_MACHINE\System\CurrentControSet\services\SomeSvr. The damage cleanup engine normally would like to replace the driver "SomeSys.sys" with the cleaned up driver "CleanSys.sys" in order to clean the malware from infected file on the host computer. Before this cleaning is performed on the host computer, the detector module will deploy the virtual machine by first generating a setting like this:

RegConfig:
\HKEY_LOCAL_MACHINE\System\Current ControSet\services\SomeSvr
  FileRelaceFrom:
C:\windows\System32\drivers\CleanSys.sys
  FileRelaceTo:
C:\windows\System32\drivers\SomeSys.sys Then, the detector module will copy files from the host computer "C:\windows\System32\drivers\CleanSys.sys" and "C:\windows\System32\drivers\SomeSys.sys" into corresponding the folder of the virtual machine, and also modify the items under "\HKEY_LOCAL_MACHINE\System\CurrentControSet\services\SomeSvr" accordingly in the virtual machine. In this way, the virtual machine may then perform the bootstrapping process using the clean driver "Cleansys" instead of the infected driver "SomeSys."

Next, in step 524 the detector module launches the virtual machine and the virtual machine will emulate bootstrapping the operating system (within its virtual environment) using the settings and files with which it has been provided. If, in step 528, the checkpoint module is reached during the bootstrap process this means that the process was successful and the detector module can alert the damage cleanup engine that the cleanup of the malware on the host computer may proceed. Accordingly, in step 532 the damage cleanup engine can then replace the infected bootstrap component with a clean version. On the other hand, if in step 528 the emulation of the bootstrap is not successful (e.g., the virtual machine hangs, the "blue screen of death" occurs, etc.) then in step 536 the detector module informs the damage cleanup engine not to clean the malware from bootstrap component because doing so would likely cause an actual bootstrap of the host computer to fail. In step 540 the damage cleanup engine (or the antivirus module) takes an action such as recording an identification of the problem and the unsuccessful bootstrap in the virtual machine, alerting the user, sending a message over an online connection regarding the bootstrap failure and the identified malware, etc.

Computer System Embodiment

Figure 6A:
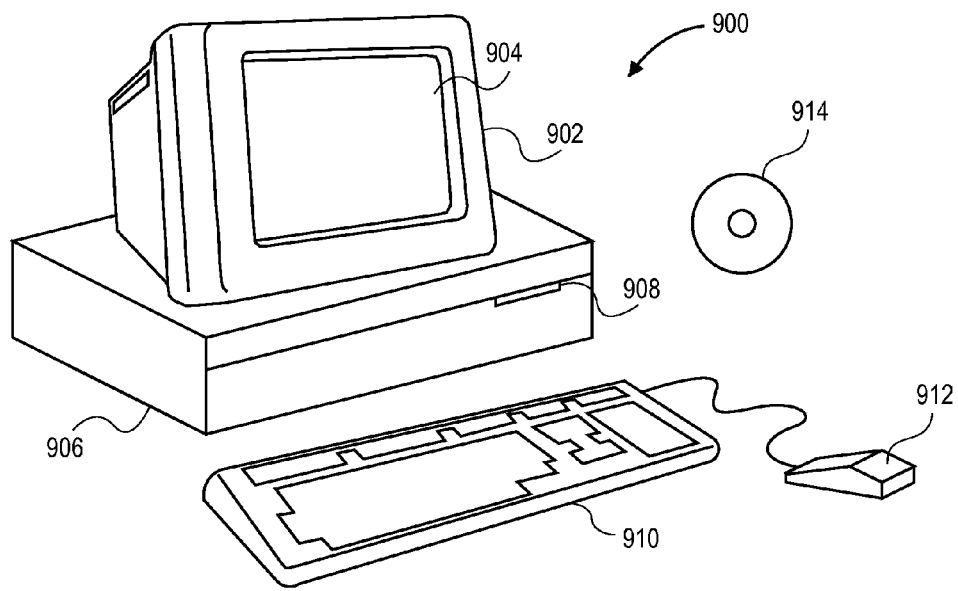
FIGS. 6A and 6B illustrate a computer system suitable for implementing embodiments of the present invention.
Figure 6B:
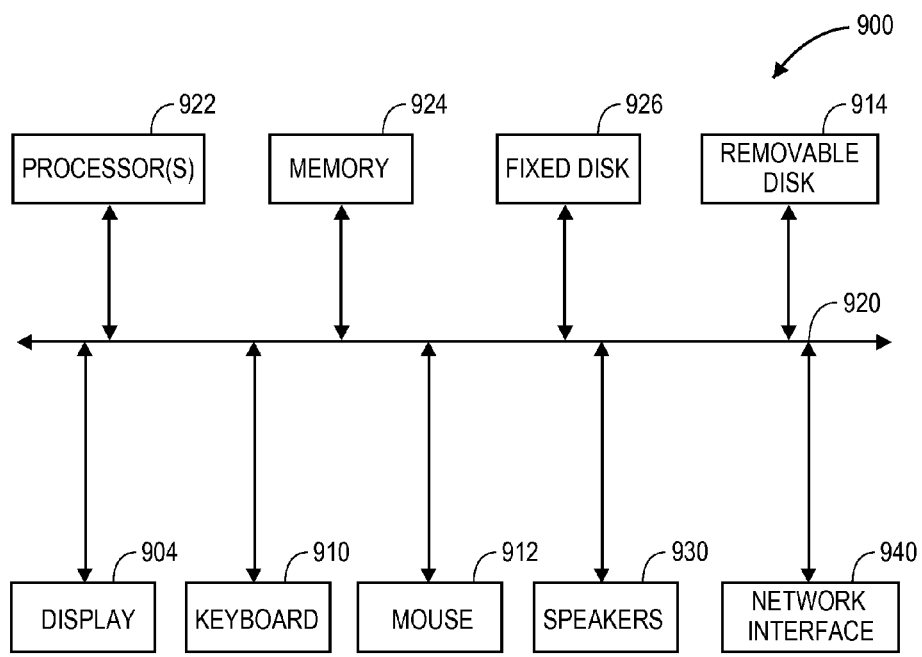

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

The invention claimed is:

1. A method of cleaning malware from bootstrap components of an operating system on a host computer while ensuring a successful bootstrap of the operating system, said method comprising:
   detecting a malware infection in a bootstrap component of said host computer, said bootstrap component being necessary in a bootstrapping process of an operating system of said host computer;
   copying a file into a virtual machine of said host computer, said file indicating computer modules necessary for said bootstrapping process;
   passing an indication of a clean version of said bootstrap component to said virtual machine; and
   launching said virtual machine and emulating said bootstrapping process of said operating system using said computer modules and said clean version of said bootstrap component to determine whether or not cleaning said malware infection from said infected bootstrap component of said host computer results in a bootstrapping failure, wherein said infected bootstrap component is not used in said emulation.

2. The method as recited in claim 1, said method further comprising:
   successfully completing said emulation; and
   cleaning said malware infection from said bootstrap component of said host computer.

3. The method as recited in claim 1, said method further comprising:
   not successfully completing said emulation;
   not cleaning said malware infection from said bootstrap component of said host computer; and
   alerting a user of said host computer of said unsuccessful emulation.

4. The method as recited in claim 1 wherein said file includes an indication of said infected bootstrap component.

5. The method as recited in claim 1 wherein said emulating said bootstrapping process further comprises:
   substituting said clean version of said bootstrap component for said infected bootstrap component.

6. The method as recited in claim 1, said method further comprising:
   not successfully completing said emulation; and
   alerting a user of said host computer of said unsuccessful emulation.

7. The method as recited in claim 1 wherein said bootstrap component is a system file, a native application or a disk sector.

8. A method of cleaning malware from bootstrap components of an operating system on a host computer while ensuring a successful bootstrap of the operating system, said method comprising:
   detecting an infected bootstrap component of said host computer, said bootstrap component being necessary in a bootstrapping process of an operating system of said host computer;
   copying a plurality of bootstrap components from said host computer into a virtual machine of said host computer, said bootstrap components necessary for said bootstrapping process and including said infected bootstrap component;
   passing a clean version of said infected bootstrap component to said virtual machine from a cleanup module of said host computer; and
   launching said virtual machine and emulating said bootstrapping process of said operating system using said bootstrap components and said clean version of said infected bootstrap component to determine whether or not cleaning said malware infection from said infected bootstrap component of said host computer results in a bootstrapping failure, wherein said infected bootstrap component is not used in said emulation.

9. The method as recited in claim 8, said method further comprising:
   successfully completing said emulation; and
   cleaning said malware infection from said infected bootstrap component of said host computer.

10. The method as recited in claim 8, said method further comprising:
    not successfully completing said emulation;
    not cleaning said malware infection from said infected bootstrap component of said host computer; and
    alerting a user of said host computer of said unsuccessful emulation.

11. The method as recited in claim 8 wherein said emulating said bootstrapping process further comprises:
    substituting said clean version of said infected bootstrap component for said infected bootstrap component.

12. The method as recited in claim 8, said method further comprising:
    not successfully completing said emulation; and
    alerting a user of said host computer of said unsuccessful emulation.

13. The method as recited in claim 8, said method further comprising:
    launching a checkpoint module during said bootstrapping process, said checkpoint module not being necessary for said bootstrapping of said host computer, said launching of said checkpoint module indicating a successful completion of said emulation.

14. A method of removing malware on a host computer while ensuring a successful bootstrap of the operating system, said method comprising:
    detecting a malware infection in a bootstrap component of said host computer, said bootstrap component being necessary in a bootstrapping process of an operating system of said host computer;
    launching a virtual machine on said host computer and copying a plurality of bootstrap components from said host computer into a virtual machine, said bootstrap components necessary for said bootstrapping process and including said infected bootstrap component;
    emulating said bootstrapping process of said operating system on said virtual machine;
    determining, via said emulated bootstrapping process on said virtual machine, whether cleaning said malware infection from said infected bootstrap component results in a bootstrapping failure;
    if the emulation of said bootstrapping process indicates a successful bootstrapping process responsive to cleaning said malware component from said infected bootstrap component, making a decision to clean said malware infection from said infected bootstrap component; and
    if the emulation of said bootstrapping process indicates a bootstrapping failure responsive to cleaning said malware component from said infected bootstrap component, making a decision to not clean said malware infection from said infected bootstrap component.

* * * * *